UNITED STATES PATENT OFFICE.

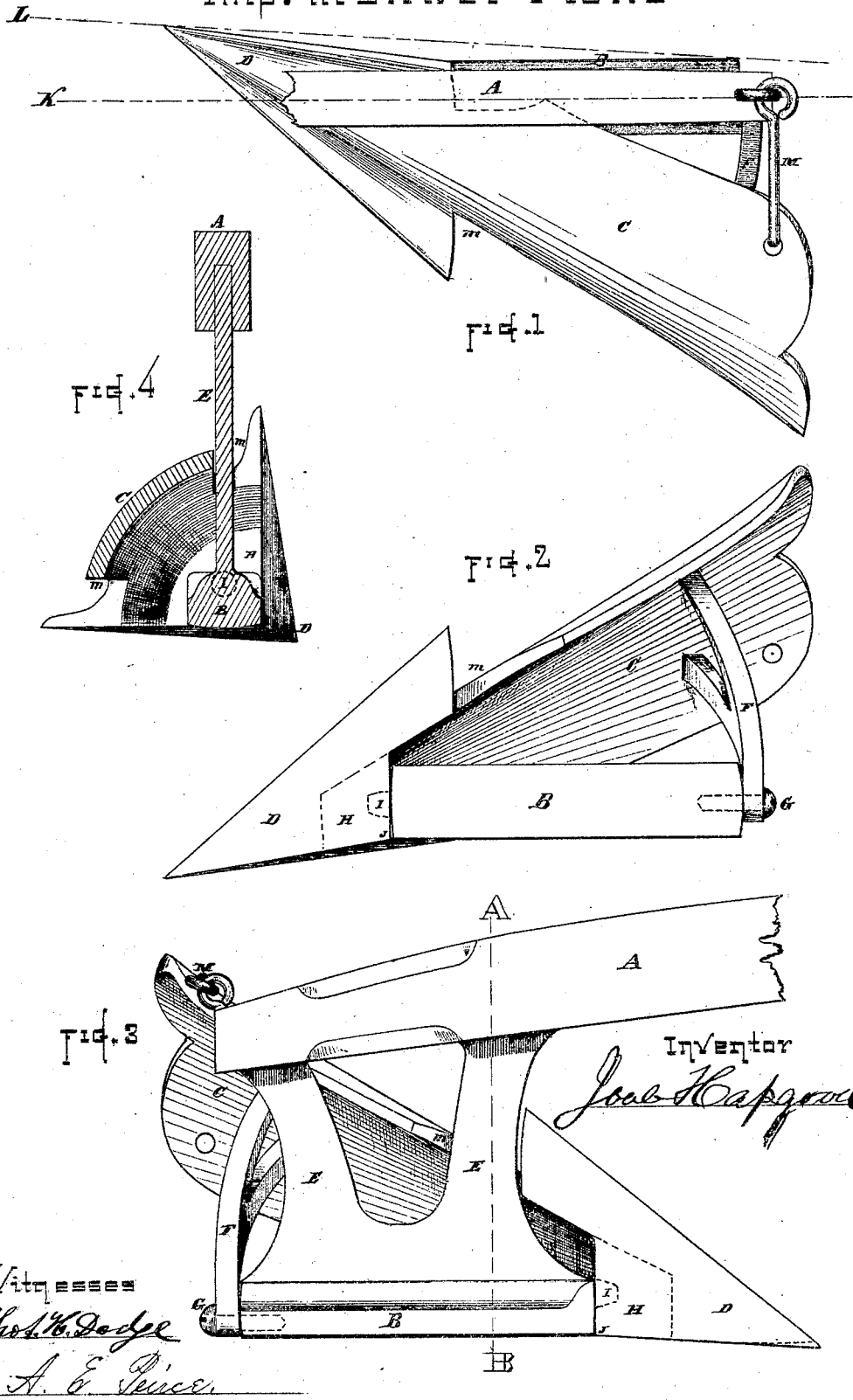

JOAB HAPGOOD, OF SHREWSBURY, MASSACHUSETTS.

IMPROVEMENT IN PLOWS.

Specification forming part of Letters Patent No. 118,932, dated September 12, 1871.

*To all whom it may concern:*

Be it known that I, JOAB HAPGOOD, of Shrewsbury, in the county of Worcester and Commonwealth of Massachusetts, have invented certain new and useful Improvements in Swivel-Plows; and I do hereby declare the following to be a full, clear, and exact description of the same, reference being had to the accompanying drawing forming a part of this specification, in which—

Figure 1 represents a plan view of so much of a swivel-plow as is necessary to illustrate my improvements. Fig. 2 represents a bottom view of the same. Fig. 3 represents a side view. Fig. 4 represents a transverse vertical section at line A B, Fig. 3.

To enable those skilled in the art to which my invention belongs to make and use the same, I will proceed to describe it more in detail.

The principal object of this invention is to furnish a swivel-plow well adapted for use with a single horse; and consists: First, in connecting a mold-board to the bed-piece by means of pivots or journals arranged in relation to the bed and mold-board substantially in the manner shown and hereinafter explained; Secondly, in a peculiarly-constructed mold-board, whereby the point of the plow can be swung past the supporting-standards toward the landside, whether turning right or left-hand furrows, as and for the purposes hereinafter explained.

In the drawing, the part marked A represents the beam; B, the bed; C, the mold-board; and D, the point. The beam A is constructed in the ordinary manner, and is attached to the bed B by means of the upright standards E E, as shown in Fig. 3. The bed B is formed in one piece with the standards E E, and is made much wider laterally than in the ordinary swivel-plows; it is also somewhat deeper vertically. The rear part of the mold-board C is secured to the heel of the bed B by the curved arm F, the pivot-bolt G, by which it is attached thereto, being arranged near the bottom of the bed B, as shown, while the forward end of the mold-board C is provided with a lug, H, to which the forward end of the bed-piece B is pivoted, the pivot I being arranged near the upper side of the bed-piece B, whereby the pivots or journals G and I are arranged out of line with a horizontal plane passing through the center of the bed-piece B, but in the same vertical plane with each other and the line of draft, which latter is indicated in Fig. 1 by the dotted line K. The hole in the lug H, into which the pivot I is fitted, is formed some distance from the angle J or lower corner of the lug, (which distance corresponds with one-half the width of the bed B,) so that the point D of the plow is thrown considerably beyond the line of draft, whereby the plow is caused to run to land far enough to take a full furrow, whether the mold-board is turned to the right or left, and that, too, without affecting the dip of the plow. This admits of the plow being used with ease and facility with a single horse, the horse traveling in the furrow last made. The line of draft and the line of cut are indicated by dotted lines K and L, respectively. Notches *m* are formed in the mold-board C at its junction with the point D so as to allow the latter to swing past the forward standard E, as indicated in the drawing. The extremity of the point D is made longer than usual, which lessens the draft and also tends to keep the plow well to land. The point D is thrown the same distance to land past the line of draft, whether plowing right or left-hand furrows, and to a much greater extent than can be done with swivel-plows as heretofore constructed, while the dip of the point or its inclination downward is not greater than with the ordinary swivel-plows. The mold-board is held in position by means of a hasp, M, at the rear end of the beam, in the ordinary manner, and the handles of the plow may be attached to the beam in any convenient manner desired.

The inclination of the point to landward in ordinary swivel-plows may also be increased by making the forward end of the recess in the point into which the lug H fits somewhat deeper than the rear end of said recess, and also increasing the length of the point. This throws the point downward in the same proportion to which it is thrown to land, thereby increasing the dip; consequently it becomes necessary, in order to counteract the increase in dip, to round off the under side of the point for a short distance back from its extremity, as indicated by the dotted line, Fig. 3. This latter mode of arranging the point may be applied to swivel-plows of ordinary construction with good results.

The eccentrically-arranged journals for connecting the mold-board to the bed may be adapted to and applied in the construction of all sizes and styles of swivel-plows, and that, too, without requiring the use of an adjustable clevis or any change in the length of yoke or evener-bar. It is also capable of being applied to plows designed for use as three-horse plows, to make them run from land instead of toward land.

The dip of the plow can be increased or diminished by increasing or diminishing the eccentricity between the journals G and I; or the plow can be made to run from land, which is necessary when three horses abreast are used, by setting the rear journal G in a higher horizontal plane than the forward journal I, thereby reversing their relative positions in relation to the lower surface of the bed.

Having described my improved swivel-plow, what I claim therein as new and of my invention, and desire to secure by Letters Patent, is—

1. The combination of the mold-board C and rear supporting-arm F with the bed B provided with journals or pivots G I, arranged in relation to each other, bed B, and mold-board C substantially as shown and described.

2. The combination of the mold-board C provided with notches m, with the bed B and supporting-standard E, substantially as and for the purposes set forth.

JOAB HAPGOOD.

Witnesses:
  THOS. H. DODGE,
  A. E. PEIRCE. (84.)